US012286855B1

(12) United States Patent
Bitar et al.

(10) Patent No.: US 12,286,855 B1
(45) Date of Patent: Apr. 29, 2025

(54) WELLHEAD CONNECTOR SAFETY SENSOR

(71) Applicant: Liberty Energy Services LLC, Denver, CO (US)

(72) Inventors: Feras Bitar, Alberta (CA); Tom Romshek, Denver, CO (US)

(73) Assignee: Liberty Energy Services LLC, Denver, CO (US)

( * ) Notice: Subject to any disclaimer, the term of this patent is extended or adjusted under 35 U.S.C. 154(b) by 0 days.

(21) Appl. No.: 18/531,875

(22) Filed: Dec. 7, 2023

(51) Int. Cl.
  *E21B 33/03* (2006.01)
  *G01D 5/14* (2006.01)
  *G08B 7/06* (2006.01)
  *G08B 21/18* (2006.01)

(52) U.S. Cl.
  CPC .............. *E21B 33/03* (2013.01); *G01D 5/14* (2013.01); *G08B 7/06* (2013.01); *G08B 21/18* (2013.01)

(58) Field of Classification Search
  CPC .............................. E21B 33/03; E21B 33/038
  See application file for complete search history.

(56) References Cited

U.S. PATENT DOCUMENTS

| | | | | |
|---|---|---|---|---|
| 8,779,932 | B2* | 7/2014 | Burzynski | E21B 41/02 340/854.3 |
| 9,644,443 | B1* | 5/2017 | Johansen | E21B 33/03 |
| 9,670,745 | B1* | 6/2017 | Johansen | E21B 33/03 |
| 9,879,496 | B2* | 1/2018 | Johansen | E21B 33/038 |
| 10,030,461 | B2* | 7/2018 | Johansen | E21B 33/038 |
| 10,072,474 | B2* | 9/2018 | Johansen | E21B 33/03 |
| 10,309,180 | B2* | 6/2019 | Johansen | E21B 33/03 |
| 10,794,137 | B2* | 10/2020 | Kibler | E21B 34/02 |
| 11,208,856 | B2* | 12/2021 | Young | E21B 33/038 |
| 11,319,766 | B2* | 5/2022 | Johansen | E21B 33/03 |
| 11,371,297 | B1* | 6/2022 | Cree | E21B 33/072 |
| 11,680,456 | B2* | 6/2023 | Johansen | E21B 33/038 166/85.1 |
| 2014/0049399 | A1* | 2/2014 | Burzynski | E21B 41/0007 340/687 |
| 2017/0268305 | A1* | 9/2017 | Johansen | E21B 33/03 |
| 2018/0080299 | A1* | 3/2018 | Johansen | E21B 33/038 |
| 2018/0179846 | A1* | 6/2018 | Johansen | E21B 33/038 |
| 2019/0003274 | A1* | 1/2019 | Johansen | E21B 33/038 |
| 2019/0145213 | A1* | 5/2019 | Kibler | E21B 34/02 166/379 |
| 2019/0292870 | A1* | 9/2019 | Goy | E21B 47/06 |
| 2019/0301260 | A1* | 10/2019 | Kibler | E21B 33/038 |
| 2019/0338613 | A1* | 11/2019 | Kibler | E21B 47/06 |
| 2020/0141196 | A1* | 5/2020 | Young | E21B 33/04 |

(Continued)

FOREIGN PATENT DOCUMENTS

RU    2767810 C1 *   3/2022

OTHER PUBLICATIONS

Read Switch Developments Corp., "What is a Reed Switch?", 2023, https://www.reedswitchdevelopments.com/what-is-a-reed-switch/, 6 pages (Year: 2023).*

*Primary Examiner* — Jennifer H Gay
(74) *Attorney, Agent, or Firm* — Haynes and Boone, LLP; Randall C. Brown

(57) ABSTRACT

A wellhead connector system is improved by the addition of sense circuitry that is used to confirm proper engagement of cam locks that engage an adaptor which may be used for pressure pumping operations, such as hydraulic fracturing, or for perforating an oil or gas well.

13 Claims, 10 Drawing Sheets

(56) References Cited

U.S. PATENT DOCUMENTS

| | | | |
|---|---|---|---|
| 2021/0123784 A1* | 4/2021 | Schwach | G01J 5/0037 |
| 2022/0373118 A1* | 11/2022 | Angstmann | F16L 37/62 |
| 2023/0272687 A1* | 8/2023 | Kibler | E21B 33/038 |
| | | | 166/330 |
| 2024/0076971 A1* | 3/2024 | Shannon | E21B 43/129 |

* cited by examiner

WELLHEAD CONNECTOR SAFETY SENSOR

BACKGROUND

Field of the Invention

The presently disclosed instrumentalities pertain to the field of oilfield pumping equipment and, particularly, pumps used in support of well stimulation work such as hydraulic fracturing operations.

Description of the Related Art

Oil and gas wells have various forms of wellhead assemblies including valves and connectors configured to permit access to and production from a wellbore as needed, but also for pressure isolation of the wellbore to prevent the unwanted escape of hydrocarbons therefrom. The process of assembling wellheads can be time consuming and may constitute a significant source of time delay because the wellhead equipment is assembled using large nuts and bolts that may require, for example, the use of sledgehammer wrenches and the connections may need to be pressure-tested. This delay is especially disadvantageous during the stage of well completion or well stimulation operations such as hydraulic fracturing where work is being performed on multiple wellheads on a wellsite location.

One proposed solution to the foregoing problem includes the locking device described in U.S. Pat. Nos. 9,879,496, 10,030,461, and 10,309,180 issued to Johansen et al., all of which are incorporated by reference to the same extent as though fully replicated herein. A commercial embodiment of what is described may be purchased on commercial order as the RigLock® wellhead connector system from FHE USA of Fruita, Colorado. As shown in FIG. 1, the connector system 100 is made ready to receive an adapter 102 that, as is well-known to the art, may be either a wellhead plug also known as a "nightcap," a discharge for pumping frac fluid into a wellbore, or a riser that may be used for positioning a wellbore tool, such as a logging tool or a perforating gun. The adapter moves downwardly 104 through guide 106 and into a position where it is retained by cam locks 108, 110, 112. O-ring seals 114 facilitate pressure pumping operations that may, for example, deliver frac fluid into an internal bore 116 that is contiguous with the wellbore (not shown). Fitting 118 includes a vent line 120 that may be connected to a valve (not shown) to purge pressure from within the connector system 100. Bolts 122 are used to couple the connector system 100 atop a wellhead (not shown) that may include valves and connectors that are used to permit access to the wellbore for downhole operations and production of hydrocarbons as needed while also permitting closure of the wellbore to isolate pressure therein as is known in the art. A locking ring 124 resides at a raised position 126 so as not to interfere with pivoting motion of cam locks 108, 110, 112.

As shown in FIG. 2, the adapter 102 has completed the downward movement 104 through the guide 106 and into a position 200 of sealing engagement where the O-rings 114 press against an interior bore 202 to form a seal that is sufficient to withstand the pressure pumping operations of a hydraulic fracturing operation where wellhead pressures are normally at 8000 psi or less, but occasionally rise to 12,000 psi or even 15,000 psi. Cam locks 108, 110 have been driven by hydraulic arms 204, 206 to pivot for respective rotations 208, 210 about pivot points P1, P2, and provide downward force against a shoulder 212, thus locking the adapter 102 into position. Subsequent to these rotations, the locking ring 124 has been hydraulically actuated to move down from position 126 into a lower position 214 where it contacts the cam locks 108, 110 at abutment points 216, 218 to secure against counter rotation that might, otherwise, release the adapter 102 from its position of sealing engagement against the interior bore 202.

In the intended environment of use, the well connector system 100 has potential to significantly expedite well stimulation operations in the nature of hydraulic fracturing. This is because the various forms of adapter 102 may be changed-out with relative ease as compared to the former method of using wrenches to secure nuts in processes of nippling-up and nippling-down the wellhead components according to operational requirements. By way of example, a hydraulic fracturing operation may be conducted in stages, such as ten stages or more, where a perforating gun is pumped downhole. The perforating gun is discharged to cut holes in a section of casing to facilitate fluidic communication with a producing formation. The form of adapter 102 that is a riser to accommodate the perforating gun is then disconnected and changed to a different form of adapter 102 communicating with the discharge side of a plurality of tandem hydraulic pumps that move frac fluid downhole to fracture the producing formation. Meanwhile, the riser form of adapter 102 may be coupled with another wellhead to perforate a different wellbore while the pressure pumping operation is underway.

Practical experience with the well connector system 100 has identified a previously unappreciated safety risk associated with the use of this type of equipment. Ideally, the locking ring 124 is observable from a distance to confirm that the locking ring 124 securely occupies the points of abutment 216, 218. It will be appreciated, however, that the locking ring 124 sometimes may tilt to position 220 which appears to be much the same as position 214 from an observation point 222. Moreover, the observation point 222 may be at a difficult angle for proper observation because there is no standard height for placement of the wellhead connector 100 as it resides atop a stack of valves and connectors that may be ten or twenty feet or more above the ground according to wellhead design. Further adding to the difficulty of observation, while the pressure pumping operation is underway the wellhead resides in what is known as a "red zone," which is an exclusionary zone of severely restricted access. This zone increases the observation distance and is established because the high wellhead pressures create a risk of serious injury or death to workers if any component might fail. A worst-case scenario is that a partially secured adapter 102 might fail at high pumping pressure with catastrophic results.

SUMMARY

The instrumentalities disclosed herein overcome the problems outlined above and advance the art by providing circuitry that confirms proper locking of the locking ring, thereby avoiding the need to rely solely upon visual observation to confirm that proper locking has occurred.

According to one embodiment, a wellhead connector system has a locking ring that is used to overfit a plurality of cam locks in a radially outboard manner. The cam locks may be hydraulically actuated to secure an adapter for fitment with a wellhead assembly. The locking ring is improved by a sensor assembly integrated with the locking ring. The sensor assembly has internal circuitry operably configured to sense proximity of each one of the plurality of cam locks and to produce an electronic signal representative of the proximity of each one of the cam locks. Control circuitry is provided to interpret the signal and instigate an alert if at least one of the cam locks is not effectively securing the adapter.

In various aspects, the internal circuitry may include a plurality of reed switches corresponding in number to the plurality of cam locks. The reed switches are actuated by a magnetic field to open and close a circuit providing a voltage signal to a microcontroller. The microcontroller interprets the voltage signal as indicating a status of the cam locks and initiates an alert if the cam locks are not properly engaged for securing the adapter to the wellhead connector assembly. The reed switches may, for example, be arranged in parallel or in series such that a positive voltage signal is interpretable as indicating that the cam locks are suitably locked into position for securing the adapter.

DETAILED DESCRIPTION

There will now be shown and described, by way of non-limiting examples, various instrumentalities for overcoming the problems discussed above. In particular, the wellhead connector device is improved by the addition of field-effect detection circuitry to confirm proper lockup of the locking ring.

Figure 1:
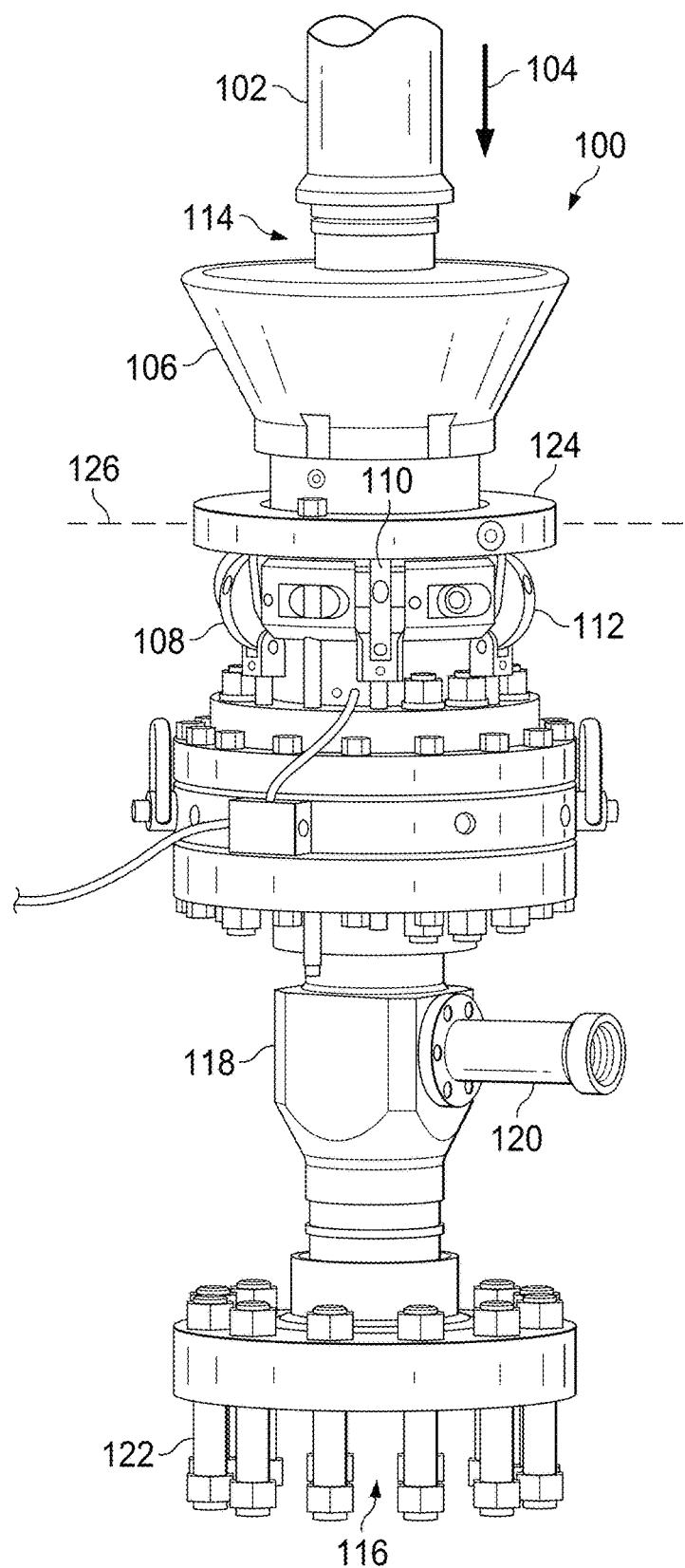
FIG. 1 shows a prior art wellhead connector system that relies solely upon visual observation to confirm proper locking according to the manner of the prior art.
Figure 2:
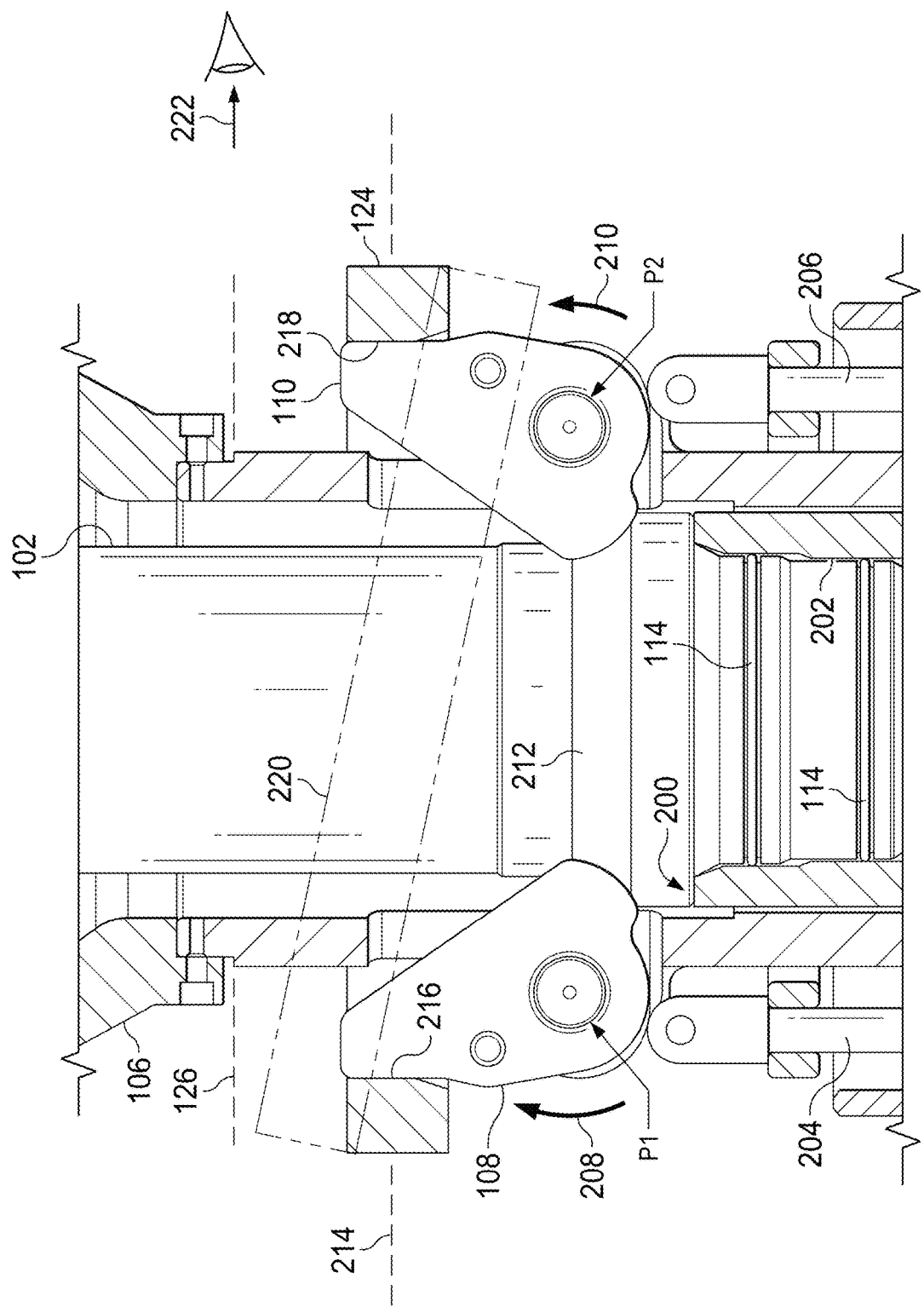
FIG. 2 is a midsection view of a selected portion of the prior art wellhead connector shown in FIG. 1, which is provided to show additional details of the locking mechanism thereof.
Figure 3:
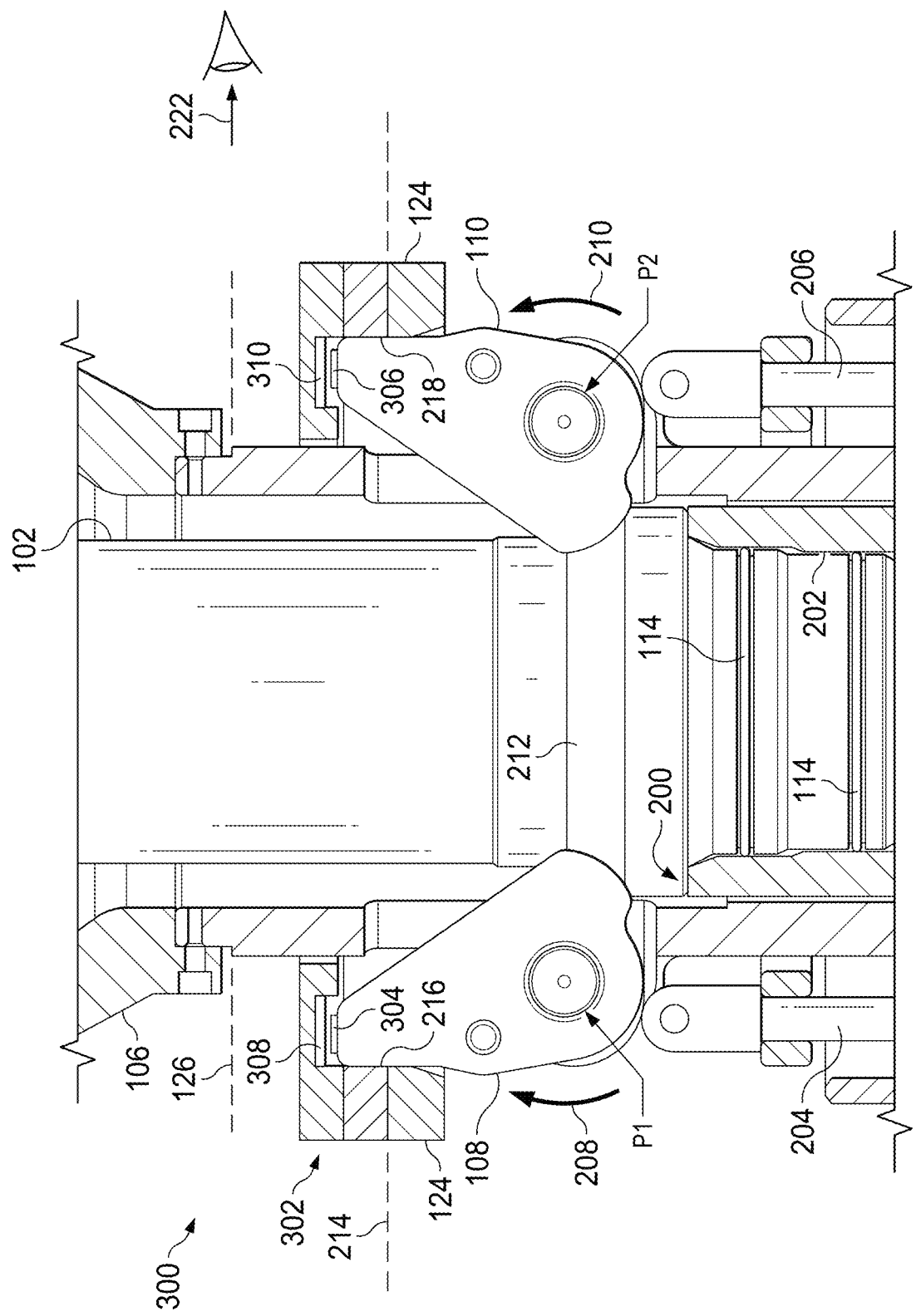
FIG. 3 shows an improved design of a wellhead connector system according to the present embodiments having a locking mechanism that is improved with respect to that of FIGS. 1 and 2 by the addition of sense circuitry that is operable to confirm proper engagement of cam locks in the wellhead connector system.

This is shown in FIG. 3 according to one embodiment. FIG. 3 shows a connector system 300 that is identical to the connector system 100 of the prior art, except the connector system 300 is improved by the addition of a sensor housing 302 attached to the locking ring 124 of FIG. 1. Further improvements include the addition of magnets 304, 306 to each of the cam locks 108, 110. The magnets 304, 306 are located remotely from pivot points P1, P2 and immediately adjacent to reed switches 308, 310 of the sensor housing 302. The total number of reed switches 308, 310 corresponds in number to the total number of the cam locks 108, 110.

The reed switches 308, 310 have reeds that interact with field effects from the magnets 304, 306 when the reed switches are in close proximity to the cam locks 108, 110. The manner of interaction is to open and close circuits that are sensed by circuitry within the sensor housing 302 to ascertain proximity of the magnets 304, 306 relative to the reed switches 308, 310 as an indicator that each of the cam locks 108, 110 are properly seated for locking engagement with the locking ring 124.

Figure 4:
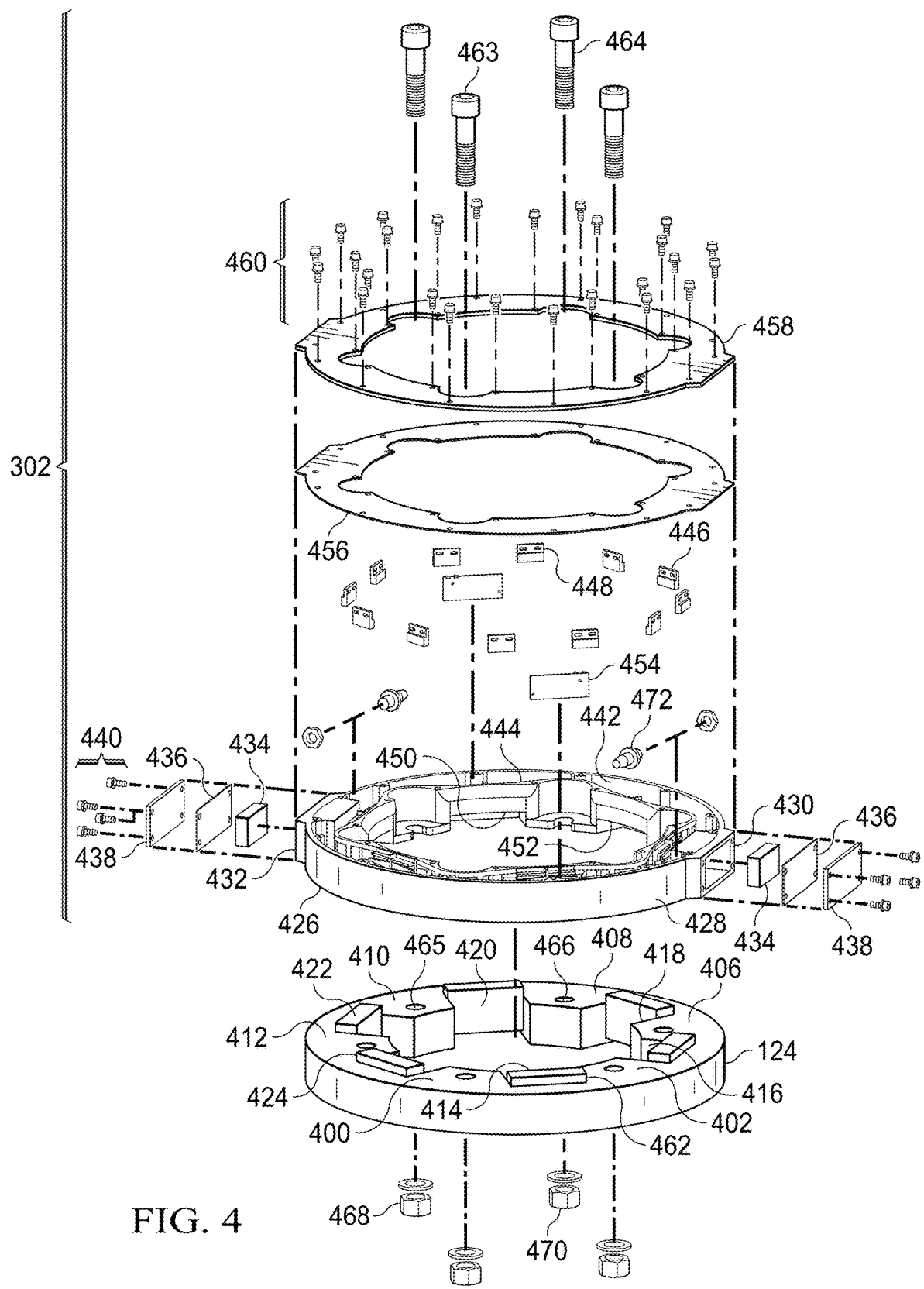
FIG. 4 is an assembly view of a locking ring with the sense circuitry for use in the improved wellhead connector system according to one embodiment.

FIG. 4 is an assembly view of the sensor housing 302 mounted atop the locking ring 124. The locking ring 124 presents quasi-frustoconical lobes 400, 402, 406, 408, 410, 412 tapering towards a radially inboard direction. The lobes 400-412 provide separations between six bays 414, 416, 418, 420, 422, 424 each of which have complementary dimensions for receipt of a corresponding one of the cam locks 108, 110 which also total six in number and are constructed to pivot within a radial plane to provide locking functionality as described above. The sensor housing 302 has an exterior shell 426 with a closed bottom (not shown) and a radially outboard wall 428. Opposed battery compartments 430, 432, each have a battery holder 434, a battery compartment gasket 436, and a battery compartment cover 438, all of which are retained by corrosion resistant screws 440. The exterior shell 426 contains interior spaces, such as spaces 442, 444, each of which overlie a corresponding one of the bays, such as bays 418, 420. The interior spaces 442, 444 are adapted to receive reed switches 446, 448, which may be the reed switches 308, 310 described above.

Internal circuit communication pathways (not shown) are routed to a conventional Long Range Wide Area (LoRa) enabled microcontroller board 454 that senses the circuitry status and provides a periodic signal reporting the circuitry status as an indicator of proper lockup. A top gasket 456 is provided to seal the interior spaces 442, 444 from ingress of liquids, and a steel top cover 458 distributes compressive sealing force against the top gasket 456 as is provided by a plurality of corrosion resistant screws 460. Each of the bays 414-424 has a corresponding upwardly protruding male nib 462 sized to mate with a corresponding female recess (not shown) in the bottom of the exterior shell 426. This mating arrangement assures proper alignment between the locking ring 124 and the exterior shell 426 while also strengthening the combined assembly against the effects of torsional forces. Hex screws 463, 464 pass through openings 465, 466 and engage nuts 468, 470 to affix the sensor housing 302 atop the locking ring 124. A USB port 472 is provided to facilitate programming of the microcontroller board 454 and to provide an alternative communication pathway in lieu of LoRa or other protocol for radio communications.

Figure 5:
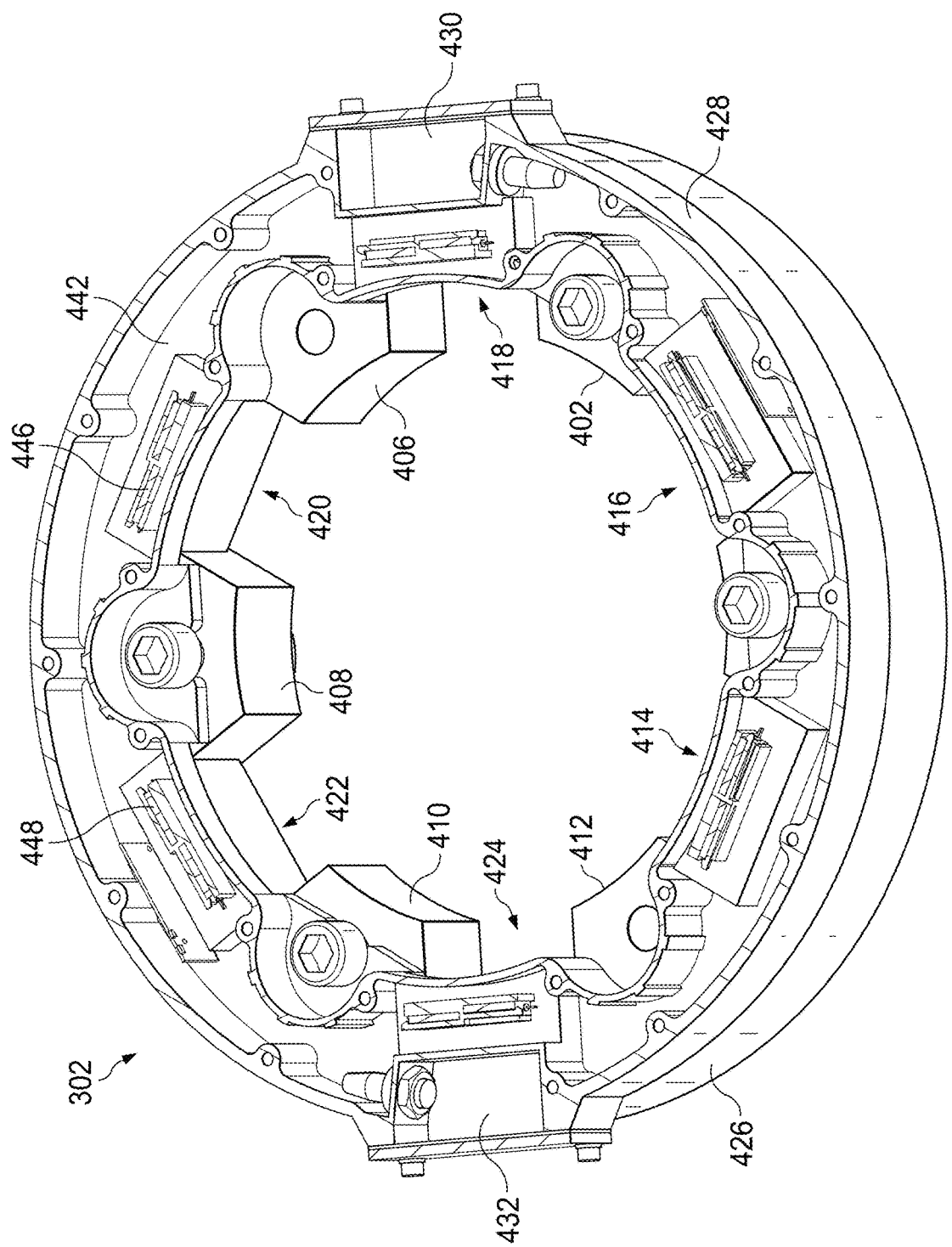
FIG. 5 is a perspective view of the assembled locking ring with the top removed.

FIG. 5 shows a partly assembled sensor housing 302 with the top gasket 456 and top cover 458 removed and the reed switches 446, 448 installed.

Figure 6:
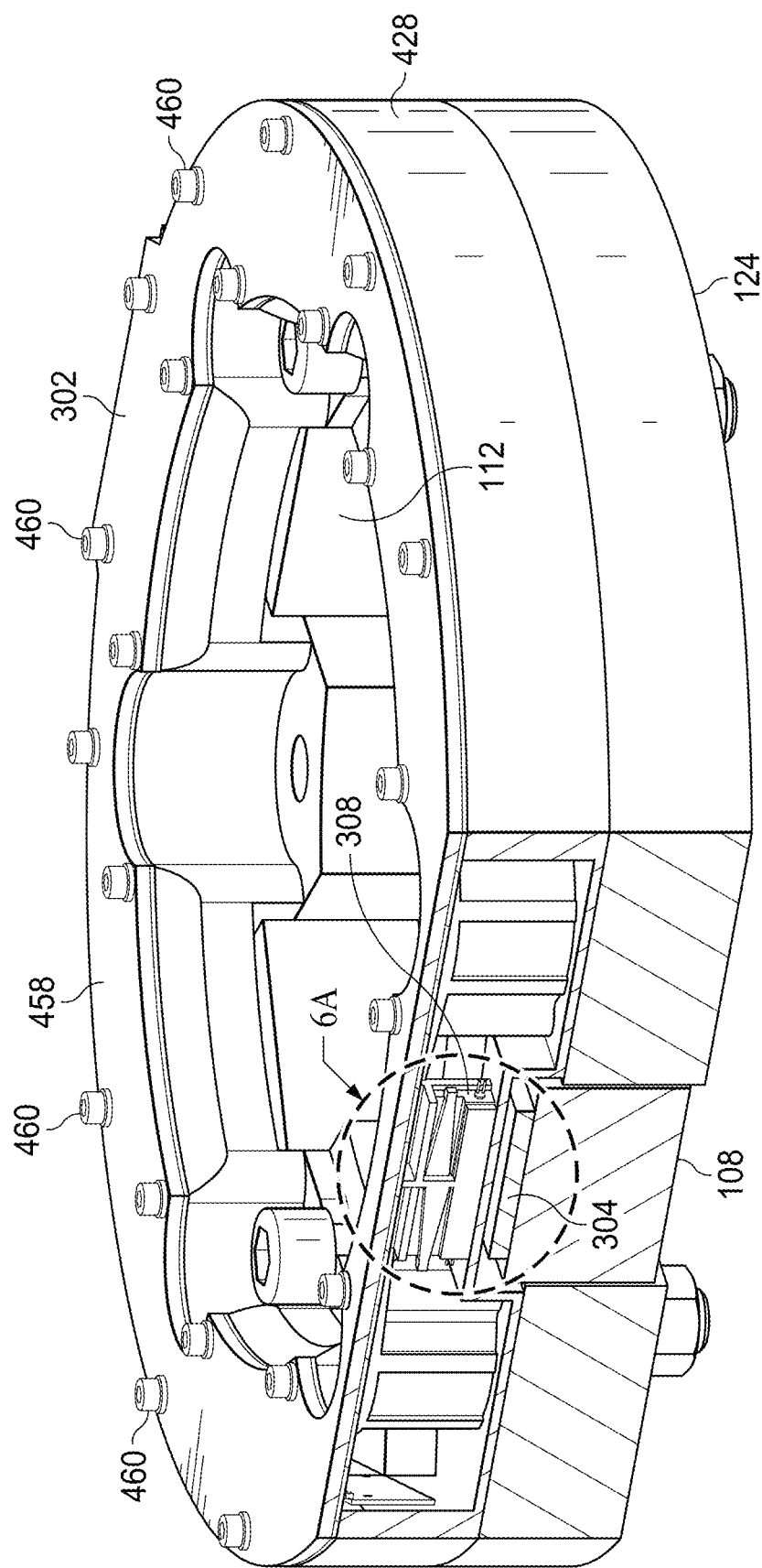
FIG. 6 is a midsection view of the assembled locking ring showing a reed switch subassembly thereof.
Figure 6A:
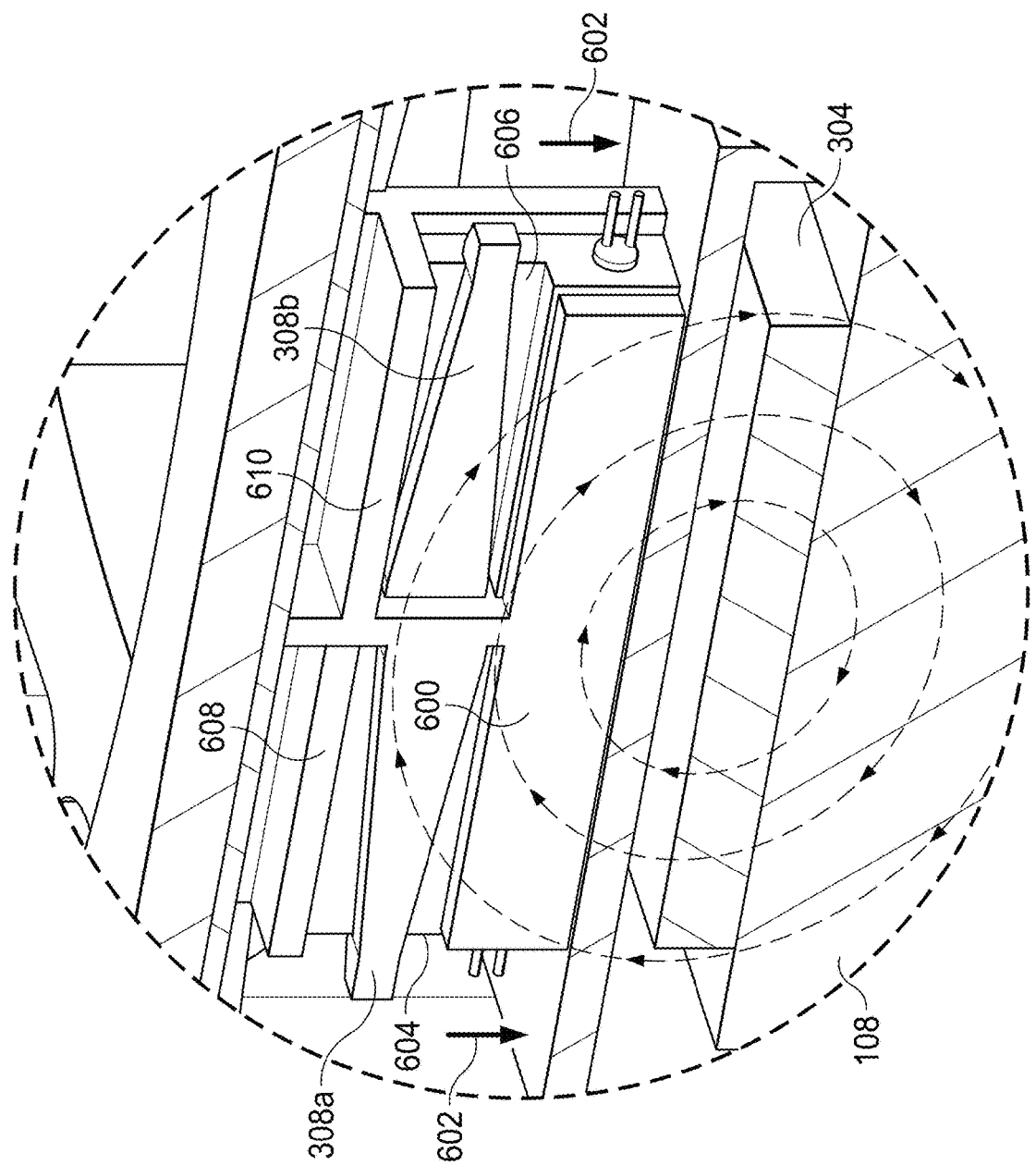
FIG. 6A provides additional detail with respect to the reed switch subassembly shown in FIG. 6.

FIG. 6 is a midsection view of the sensor housing 302 mounted atop the locking ring 124, with FIG. 6A presenting additional detail with respect to a selected portion thereof. As shown in FIGS. 6 and 6A, the cam locks 108, 112 have been pivoted to reside in a position of locking engagement with the locking ring 124. In this position, the magnet 304 is located immediately beneath reed switch arms 308a, 308b. Exposure to a magnetic field 600 emanating from the magnet 304 pulls the respective reed switch arms 308a, 308b downward and into contacts 604, 606 to complete a circuit, which permits a voltage to be passed to the microcontroller board 454 as an indicator that the cam lock 108 is properly engaged. Alternatively, the contacts 604, 606 may reside on walls 608, 610 such that the contact is broken by the downward motion 602 of switch arms 604, 606 and the absence of voltage indicates a lack of locking engagement. If the locking cam 108 does not reside immediately next to the reed switch 308, the magnetic field is not sufficiently strong to move the switch arms 308a, 308b such that the sensed status of the reed switch arms 308a, 308b is interpretable as an indicator of improper positioning of the cam lock 108. The same magnetic sense circuitry is provided to each of the cam locks 108-112.

Figure 7:
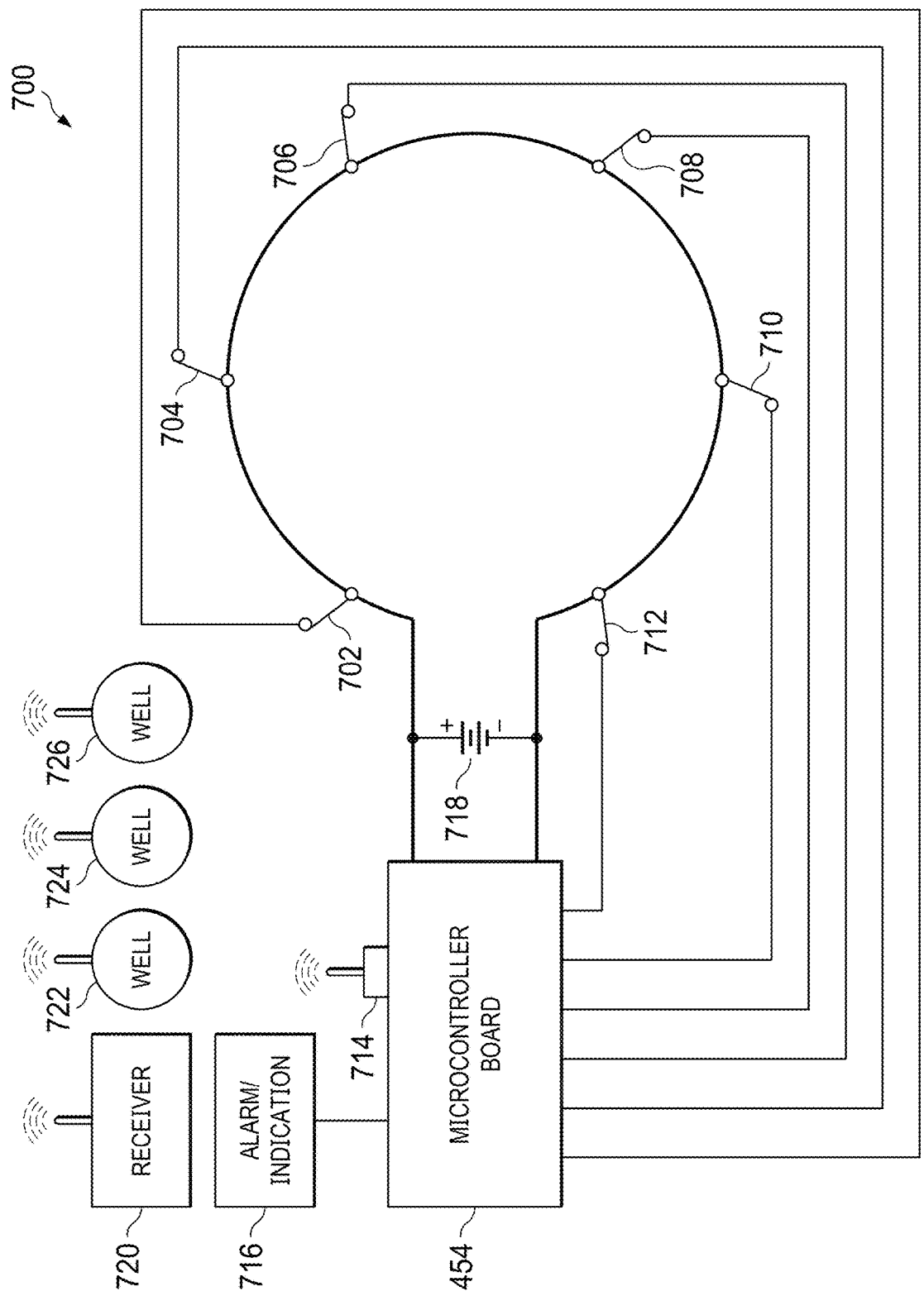
FIG. 7 is a circuit diagram of the sense circuitry according to one embodiment.

FIG. 7 shows latch detection circuitry 700 that may be provided internal to the sensor housing 302 according to one embodiment. Switches 702, 704, 706, 708, 710, 712 are arranged in series and constitute reed switches, such as the reed switches 308, 310, 446, 448 described above. Once the microcontroller board 454 is placed in active mode, as opposed to sleep mode, the microcontroller board 454 interprets a change in voltage arising from the opening or closing of switches 702-712 as an indicator of proper lockup as described above in the context of FIGS. 6 and 6A.

If the voltage does not change for any one of the switches 702-712 then the microcontroller board 454 interprets this as an unsafe condition due to improper lockup. In the case of improper lockup as interpreted by the microcontroller board 454, this triggers an alarm condition which may be an audio and/or visual indicator 716 connoting that a corresponding one of the locking cams 108-112 is out of position with respect to a corresponding one of the reed switches 702-712. It will be appreciated that each of the reed switches 702-712 preferably has an individual circuit that runs in parallel with the other circuits. Thus, the microcontroller board 454 is able to trace the lockup fault condition back to a particular one of the locking cams 108-112 through the interpreted open or closed status of a corresponding one of the reed switches 702-712. This information may be reported for maintenance purposes so that a technician engaged in fault diagnosis or repair in response to the alarm condition may be better informed about the cause of lockup failure. A battery 718 powers the microcontroller board 454, the alarm 716 and the individual sense circuits incorporating the reed switches 702-712.

The microcontroller board 454 includes a transmitter or sending unit 714 that engages in LoRa protocol communications with a remote receiver 720 that monitors the signals from the microcontroller board to instigate alerts as needed. The remote receiver 720 may additionally communicate with other well sending units 722, 724, 726, in order to monitor the alert status of more than one well.

Figure 8:
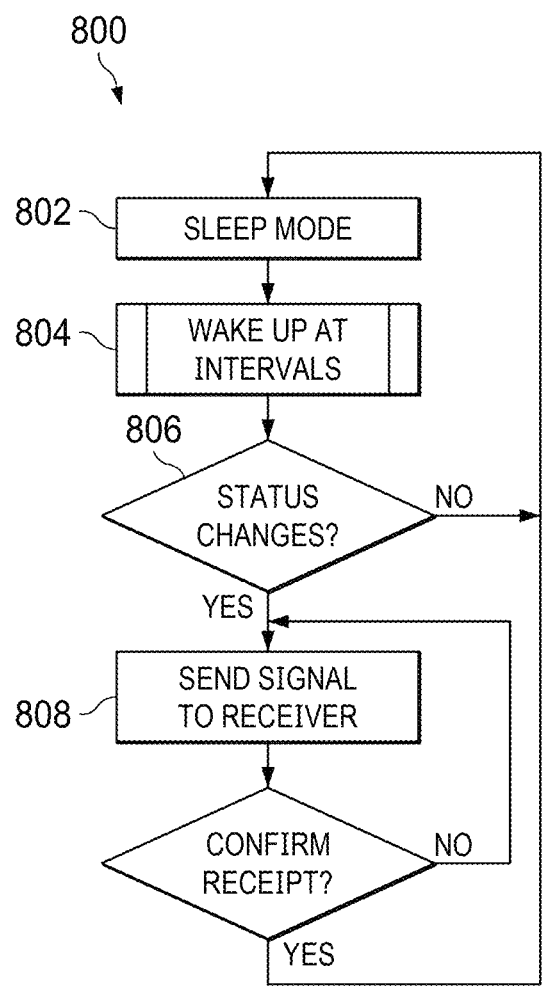
FIG. 8 shows program logic for operation of sensor electronics to provide signals indicative of an alert condition identified by the sense circuitry.

FIG. 8 shows program logic 800 that may be implemented on the microcontroller board 454 by use of program instructions. The microcontroller board 454 is placed in sleep mode 802 to conserve battery power and wakes up 804 at a predetermined interval of time, such as 4 to 8 seconds. Upon wakeup, the microcontroller board analyzes the signals from each of the circuits for reed switches 702-712 (see FIG. 7) and determines 806 whether any one circuit has changed status since the circuit was last sensed. If there is no change of status, the microcontroller board 454 returns to sleep mode 802. If there has been a change of status, the microcontroller board 454 sends a signal 808 to the receiver 720 and listens for a return signal from the receiver 720. If no signal is received within a predetermined amount of time, then an additional signal is sent 808. If a confirmation signal is received, then the microcontroller board 454 goes back to sleep mode 802.

Figure 9:
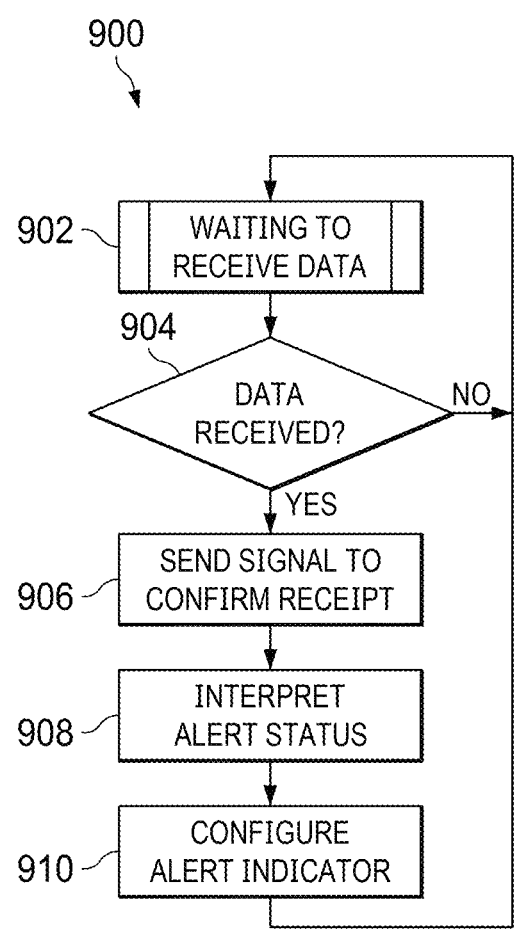
FIG. 9 shows program logic for operation of receiver electronics that responds to signals from the sensor electronics to control the operation of an alarm indicator that warns of an unsafe condition due to improper lockup.

FIG. 9 shows program logic 900 that may be implemented on the receiver 720 by use of program instructions. The receiver 720 waits 902 to receive data from the microcontroller board 454 and continues waiting until the data is received 904. Once data is received, the receiver 720 sends a signal to the microcontroller board 454 confirming receipt of the data. The receiver 720 interprets 908 and records a status reflecting any change in status as represented in the signal from the microcontroller board 454. This interpretation may reflect, for example, the opening or closing of all reed switches 702-712 as indicating that all of the cam locks 108, 112 are fully engaged or fully released. The signal may alternatively show that one or more of the cam locks is not fully engaged while others are engaged, which is interpreted as an alert condition because there is an unsafe condition. The receiver 720 suitably configures 910 the alert indicator 716 which may be an audible alarm broadcast over a speaker, or a light, LED or other optical device used to indicate an alarm when there is an unsafe condition due to improper lockup.

Those of ordinary skill in the art will understand that the foregoing discussion teaches by way of example and not by limitation. Accordingly, what is shown and described may be subjected to insubstantial change without departing from the scope and spirit of invention. The inventors hereby state their intention to rely upon the Doctrine of Equivalents, if needed, in protecting their full rights in the invention.

We claim:

1. In a wellhead connector system having a locking ring used to overfit a plurality of cam locks that secure an adapter for fitment with a wellhead assembly, the improvement comprising:
    each cam lock of the plurality of cam locks being equipped to emit a magnetic field;
    a sensor assembly integrated with the locking ring;
    the sensor assembly having a plurality of sensors corresponding in number to that of the plurality of cam locks;
    each sensor of the plurality of sensors comprising a reed switch that is responsive to the magnetic field emitted by a corresponding one of the plurality of cam locks when in close proximity to the corresponding one of the plurality of cam locks, such that the magnetic field changes an electronic state of the sensor to provide an electronic signal interpretable as a locking status of the corresponding one of the plurality of cam locks, wherein each reed switch is deployed in an individual circuit to form a plurality of such individual circuits running in parallel to the control circuitry; and
    control circuitry configured to interpret the signal from each sensor of the plurality of sensors and instigate an alert if at least one of the plurality of cam locks is not effectively securing the adapter.

2. The improved wellhead connector system of claim 1, wherein the signal from each sensor of the plurality of sensors is a voltage signal.

3. The improved wellhead connector system of claim 1 wherein the electronic state of the respective reed switches changes from an open circuit to a closed circuit in response to the magnetic field.

4. The improved wellhead connector system of claim 1 wherein the electronic state of the respective reed switches changes from a closed circuit to an open circuit in response to the magnetic field.

5. The improved wellhead connector system of claim 4 including a speaker to broadcast the alert.

6. The improved wellhead connector system of claim 4 including an optical device to implement the alert.

7. The improved wellhead connector system of claim 1, wherein the sensor assembly resides in a housing located above the locking ring.

8. The improved wellhead connector system of claim 7, wherein the control circuitry includes a long range wide area equipped microcontroller.

9. The improved wellhead connector system of claim 8, wherein the housing includes at least one battery compartment with a battery configured to provide power to the long range wide area equipped microcontroller and the plurality of sensors.

10. The improved wellhead connector system of claim 1 mounted on a wellhead to secure the adapter.

11. The improved wellhead connector system of claim 1, wherein the plurality of cam locks includes at least six cam locks.

12. The improved wellhead connector system of claim 1, wherein the plurality of cam locks consists of six cam locks.

13. The improved wellhead connector system of claim 1, wherein the electronic state of the sensor indicates an unsafe condition.

\* \* \* \* \*